July 3, 1923.
R. A. WILSON
1,460,464
TOURING AND CAMPING CAR
Filed Oct. 1, 1921
7 Sheets-Sheet 1
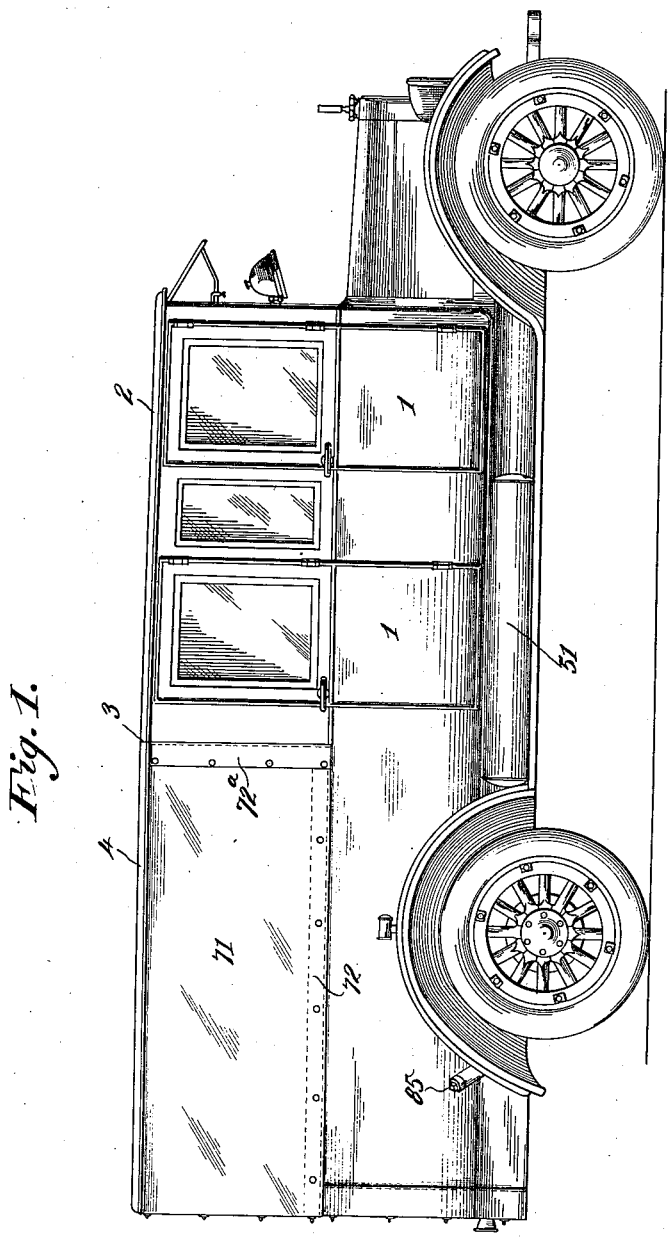
Inventor
Roland A. Wilson
By Marsh, Fenwick & Lawrence
Attorneys

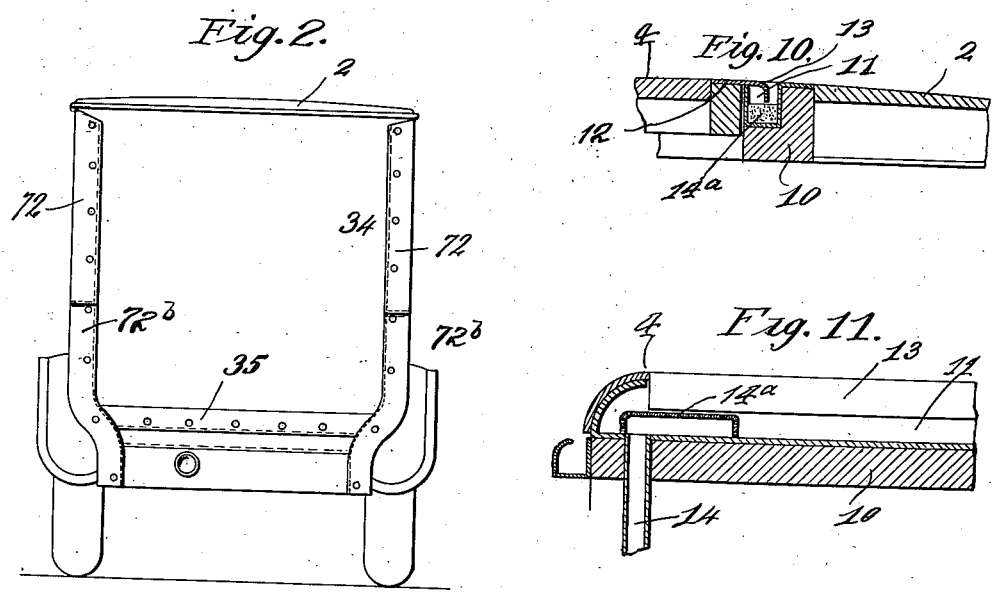

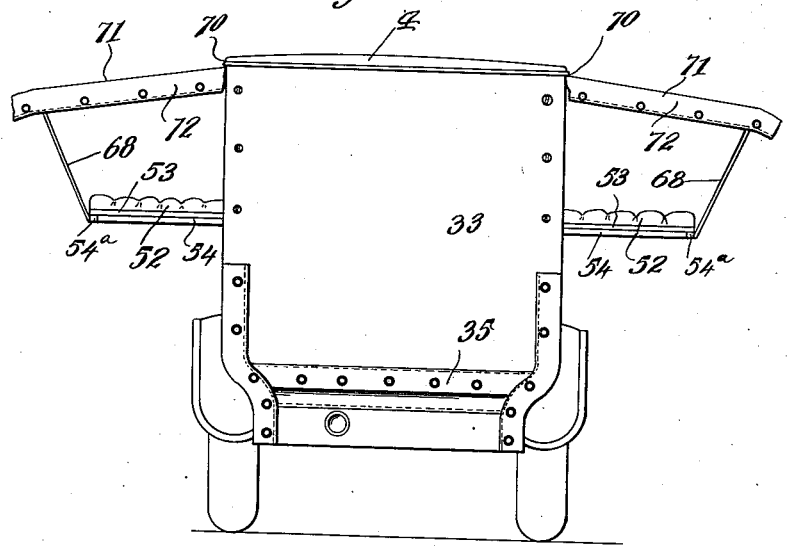
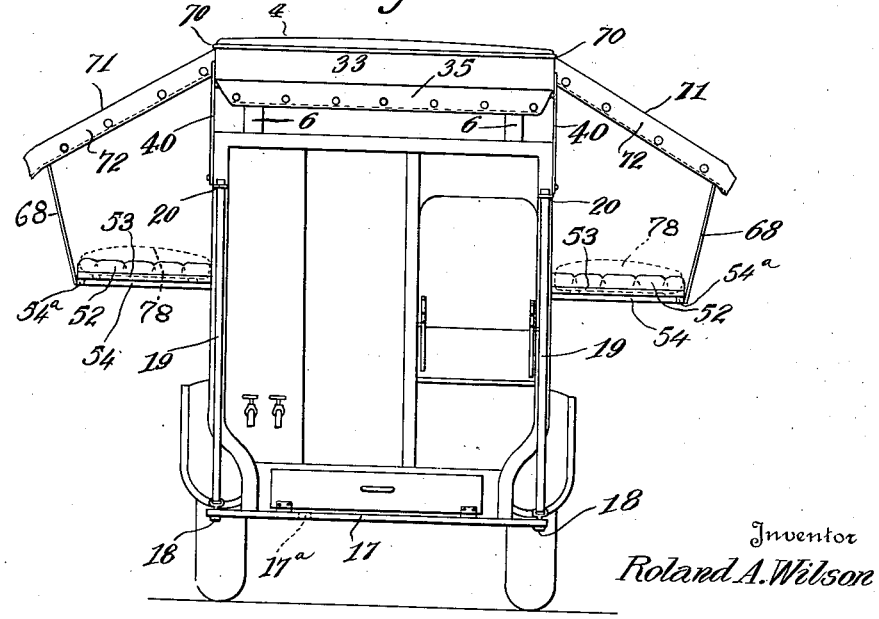

July 3, 1923.

R. A. WILSON

TOURING AND CAMPING CAR

Filed Oct. 1, 1921

Inventor
Roland A. Wilson

By Mason, Fenwick & Lawrence
Attorneys.

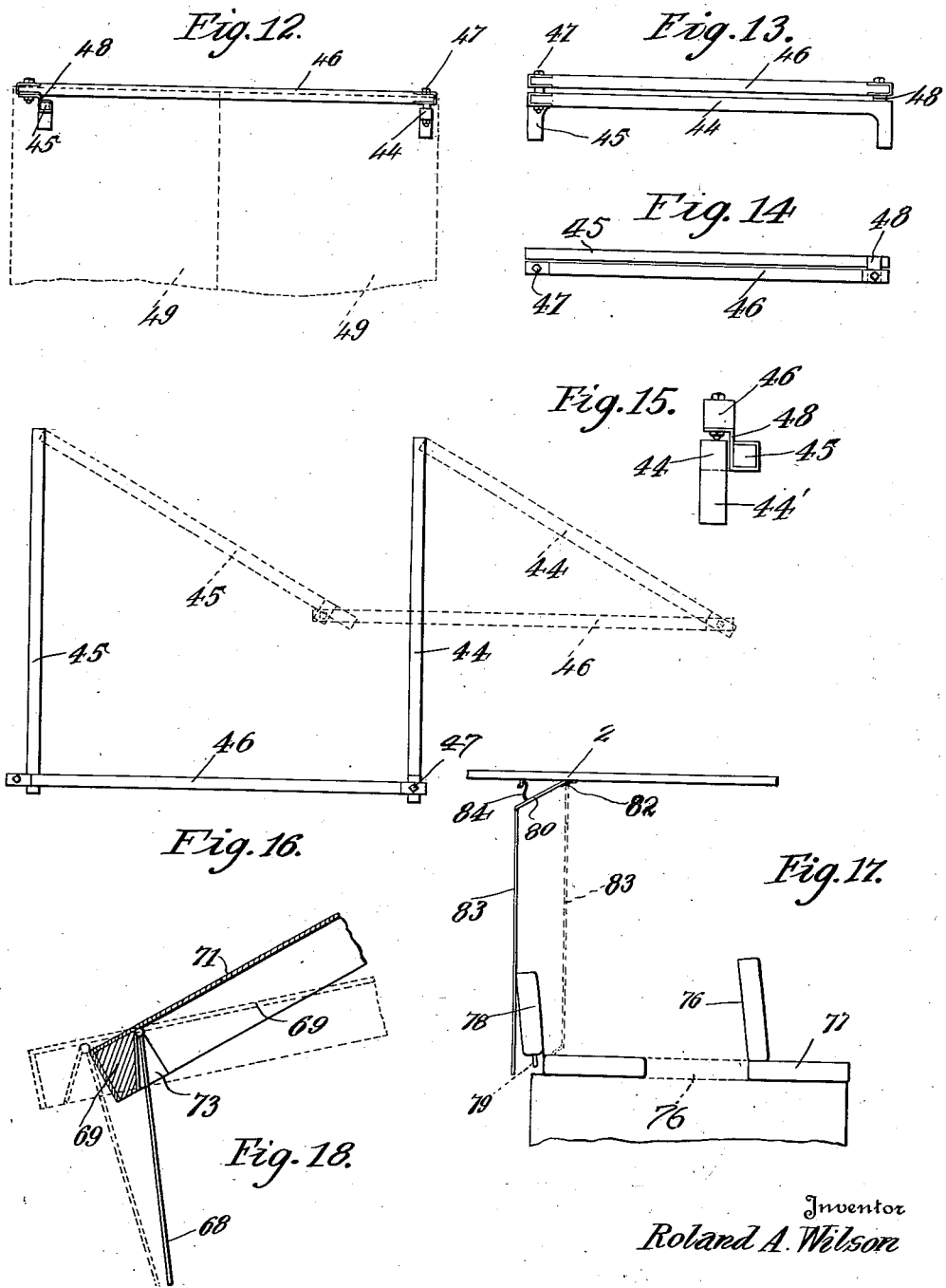

July 3, 1923.

R. A. WILSON

TOURING AND CAMPING CAR

Filed Oct. 1, 1921

Inventor
Roland A. Wilson
By Mason, Fenwick & Lawrence
Attorneys

Patented July 3, 1923.

1,460,464.

UNITED STATES PATENT OFFICE.

ROLAND A. WILSON, OF TAMPA, FLORIDA.

TOURING AND CAMPING CAR.

Application filed October 1, 1921. Serial No. 504,628.

*To all whom it may concern:*

Be it known that I, ROLAND A. WILSON, a citizen of the United States, residing at Tampa, in the county of Hillsborough and State of Florida, have invented certain new and useful Improvements in Touring and Camping Cars; and I do hereby declare the following to be a full, clear, and exact description of the invention, such as will enable others skilled in the art to which it appertains to make and use the same.

This invention relates to touring vehicles affording accommodation for sleeping and subsistence.

An object is to enable a vehicle body having an appearance similar to that of an ordinary closed motor car body to be quickly converted in such manner as to provide sleeping, kitchen and dining room quarters, and as quickly restored to the normal appearance of a passenger vehicle.

The invention consists in the several combinations, subcombinations and details of structure set forth more particularly in the ensuing description, defined in the appended claims and illustrated in the accompanying drawings.

In the drawings in which like parts are indicated by like reference characters throughout the several views:

Figure 1 is a side elevation of a motor vehicle embodying my invention in travelling condition;

Figure 2 is a rear elevation of the vehicle in the condition shown in Figure 1;

Figure 3 is a side elevation of the rear portion of the vehicle body with parts broken away;

Figure 4 is a rear elevation showing sleeping berths unfolded in position to be occupied and with adjustable top lowered;

Figure 5 is a rear elevation of the vehicle showing the adjustable top elevated, the sleeping berths unfolded and a rear folding platform lowered to provide accommodations for preparing food and for dining, but without rear compartment screen;

Figure 10 is a fore and aft section through the joint between the permanent and adjustable roof sections;

Figure 11 is a transverse section through the roof of the car body lengthwise of the said joint;

Figure 12 is a detail, viewed from the rear, of folding supports for the kitchen compartment screen opened;

Figure 13 is a detail view from the rear of the said folding supports closed or folded;

Figure 14 is a detail view of the parts shown in Figure 13, viewed from above;

Figure 15 is a view of said supports, folded, seen from one side of the vehicle;

Figure 16 is a view of said supports looking down upon them when open or unfolded, the dotted line position indicating the initial folding movement;

Figure 17 is a diagrammatic view in side elevation of the seating equipment and adjustable curtain over the back of the rear seat;

Figure 18 is a section through a portion of one of the berth-awning bows;

Figure 6:
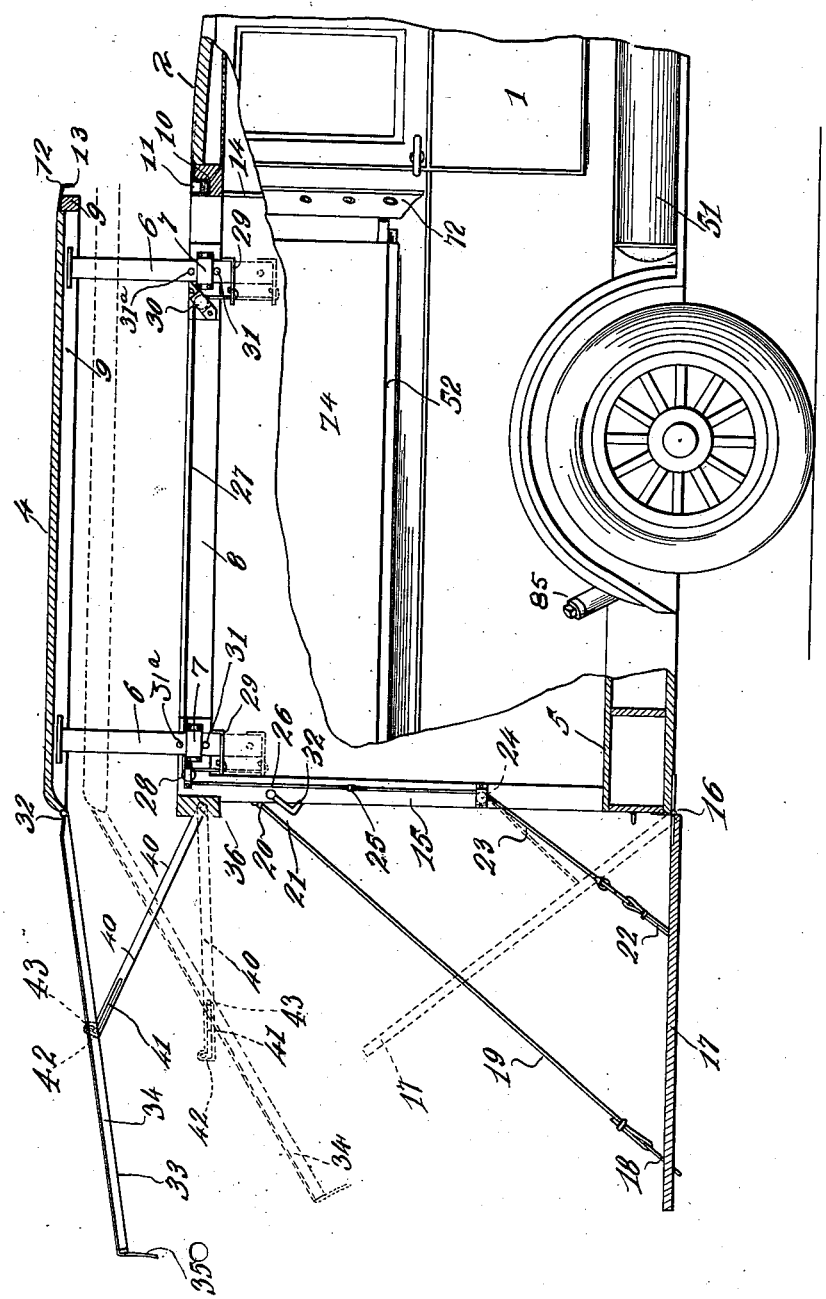
Figure 6 is a side elevation of the rear of the vehicle body, partly in longitudinal section, showing the adjustable top elevated and the rear folding platform lowered.

The improved body may be mounted upon an ordinary standard chassis of a passenger motor car. It has the appearance of a sedan or wholly enclosed passenger body except that the rear portion of the body is extended a somewhat greater distance rearward of the rear axle than in the ordinary passenger car. A pair of doors 1 is provided in each side for admitting passengers to the front and rear seats. Covering the forward portion of the body is a permanent roof part 2 which extends rearward to the joint 3. Rearward of the joint 3 is an adjustable roof section 4 which may be elevated or lowered at will. The adjustable roof section 4 is mounted upon four uprights 6 which slide in guides 7, shown in the form of U-straps bolted to the upper fore and aft side members 8 of the body frame. The said top 4 comprises a frame 9 which may be of bent wood substantially in the form of a rectangle and there may be a light cover of any suitable material filling the space between the sides of said frame. The said section 4 is adapted to be elevated such a distance as to afford full standing room between it and the floor 5. When the adjustable roof section 4 is lowered the front cross member of the frame 9 adjoins the cross carline 10 at the rear of the permanent top 2. In the rear part of the said carline 10 is a transverse trough 11, preferably metal lined, having its opposite ends closed. Overhanging the front cross bar of the frame 9 is a strip of sheet metal 12 having a downturned lip 13, said lip 13 being adapted to enter the trough 11 when the said top section is lowered flush with the permanent section 2. The opposite ends of the carline 10 are neatly finished to the proper contour, as indicated in Figure 11. Depending from one end of said trough 11 is a suitable drain pipe 14 extending downward within the side walls of the body through which water may drain from the trough 11 to the ground. A screen 14$^a$ may be placed over the drain opening to prevent it from becoming clogged. By this construction no rain water can enter the body through the joint between the permanent roof section 2 and the adjustable roof section 4 when the latter is closed.

Should it be desired to hold the adjustable roof section 4 permanently elevated this may be done by inserting pins into holes 31$^a$ formed in the uprights 6 just above the guide 7 when the roof section is in its uppermost position.

Hinged to the rear lower corner of the body at 16 is a stout platform 17 which may be lowered to horizontal position, as shown in Figure 6, or may be elevated so as to close the rear end of the body. Connected to the platform 17, near its rear edge, are removable strap anchors 18, one on each side of the platform. Detachably connected at one end to each anchor 18 is a flexible stay 19, such as a stout strap, the other end of which is connected at 20 to one of the upright rear frame members 15 of the body. The flexible stay 19 is to limit the descent of the platform 17 and may be adjusted so that when the said platform 17 is lowered it will be in a horizontal position. Connected to the platform 17 nearer the hinge 16 are other anchoring devices 22, one on each side. Detachably secured to each of the anchoring devices 22 is a halyard 23, which may be a steel cable that leads from the anchoring device 22 over a sheave 24 secured to an upright rear member 15 of the body frame and thence upward to the point 25 from which two branch cables 26 and 27 extend over a double sheave pulley 28. The branch 26, extending over one of the sheaves, is directed downward the end being secured to a bracket 29 fixed to the lower end of a rear adjustable upright 6. The outer branch cable 27 passes forward over a sheave 30 secured to one of the side top bars 8 of the frame near the front thereof and extending downward is fastened to a bracket 29 at the lower end of a front adjustable upright. The brackets 29 extend rearward from the lower end of standards 6 and have two holes through which the end of the respective branch cables may be adjustably threaded to provide for varying the length of cable between the brackets and platform. The construction described being the same upon both sides, it will be apparent that when the platform 17 is lowered the adjustable roof section 4 will be elevated. Pins 31, inserted in suitable holes in adjustable uprights 6, may serve as stops to limit the elevation of the roof 4 and the lowering of platform 17. The weights of the platform 17 and the roof section 4 may be so adjusted that they substantially counterbalance each other and the cable may be so adjusted in length that the platform will not lift the roof section until it has moved a little distance. It thus requires little or no effort to pull down the platform 17 and elevate the roof 4 or to restore the platform 17 into position to close the rear end of the vehicle body and lower the adjustable roof section. The platform 17 may be secured in elevated position by any suitable catch. I have shown, by way of illustration, a hook 32 upon one of the rear upright members of the body frame which may be engaged over the upper or rear edge of the platform 17.

Hinged at 32 at the rear end of the adjustable roof section 4 is a substantially rectangular awning and cover frame 33. This frame 33 may be composed of bent wood substantially rectangular in outline over which a suitable waterproof fabric 34 is tightly stretched, a flap 35, provided with eyelets or the like, extending beyond the rear transverse member of the frame. It will be observed that the hinge 32 is in a perpendicular plane rearward of the hinge 16 by a distance substantially equal to the thickness of the platform 17 and that a member 36 secured to uprights 15 of the body forms an offset whereby the rear face of the offset portion is substantially in a plane intersecting the hinge 32 while the rear face of said standard is in a plane intersecting the hinge 16. It is intended that when the platform 17 is folded up against the body so as to close the rear end thereof that the awning shall fold down over said platform and be secured in place by fastening devices, such as carriage curtain buttons, on the rear side of the platform 17 which engage the eyelets in the flap 35, and by side flaps 72 and 72<sup>b</sup> adapted to be bent around the upright corners and be buttoned to suitable fasteners on the edges of the platform.

Hinged at opposite sides of the rear uprights of the body are brace arms 40. The outer ends of these brace arms 40 are slotted as at 41, the outer end of each slot having an upward offset notch 42. On opposite sides of the awning frame 33 are laterally projecting headed pins 43 which engage in the slots 41 of said arms 40. The length of the slots 41, the position of the pins 43 and the offset notches 42 are such that when the top 4 is down, and the platform 17 up or folded, the awning frame may fold closely over the rear of the body and parallel with and in substantial contact with the rear side of said platform 17. In this folded position the pins 43 are in substantial contact with the inner ends of the slots 41 in arms 40. When the top section 4 is down and awning frame 33 is swung outward, the pins 43 move slightly outward in slots 41 causing the brace arms 40 also to swing outward. The pins 43 move in the slots 41 because the radial distance from said pins to the hinge 32 is slightly greater than the distance from the inner end of the slot 41 to the pivot of arm 40 when the roof section 4 is lowered. When the awning frame has been swung outward far enough to permit access to them, hooks 32 may be released from platform 17 and said platform pulled back. The awning must now be lifted high enough to clear the outer edge of the platform as it swings downward. As the platform lowers, the roof section 4 rises, as described. As the roof section 4 rises it carries with it the hinged end of the awning; the pins 43 are now permitted to rest against the inner end of slots 41 in braces 40, and the awning moves bodily upward under the combined action of the rising roof section and the swinging movement of arms 40 pivoted on the main frame, until the platform 17 reaches a horizontal position. Should it be desired now to raise the awning higher, the operator steps on the rear edge of platform 17 and pushes the awning upward until the pins 43 engage the notches 42, whereupon the arms 40 drop by gravity causing the pins to engage in said notches and brace the awning in the position indicated in full lines in Figs. 6 and 7. A suitable socket 17<sup>a</sup> may be provided in the platform for receiving the supporting standard of a temporary dining table. The arrangement of the parts described facilitates the preparation of the cooking and dining apartment of which the platform 17 constitutes the floor and the awning 33, 34 the roof.

Figure 7:
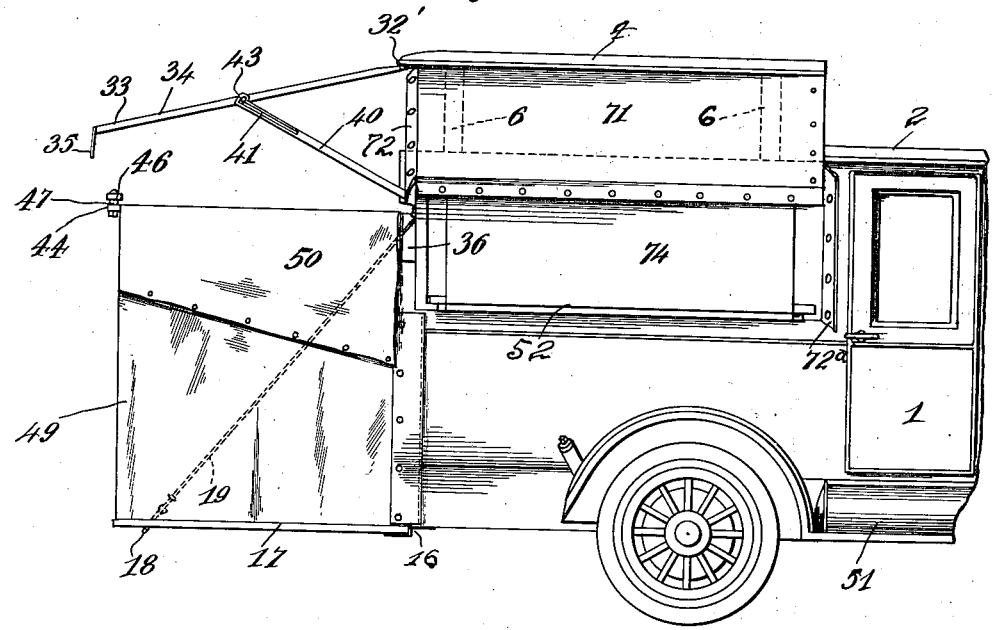
Figure 7 is a side elevation showing the sleeping berths unfolded, the rear platform lowered and the screen in place to provide a compartment thereover.

Mounted on the opposite rear uprights 15 of the body frame just below the offset 36 are a pair of arms 44, 45 of a length substantially equal to the length of the platform 17 measured in a fore and aft direction. These arms are pivoted on relatively long vertical pintles giving the arm capacity to resist vertical strains. Their outer ends are connected by a cross link 46 having its opposite ends pivoted to said arms; said arms and links are intended to be folded in a zigzag fold, lying snugly across the rear of the body between the frame uprights 15. To the end of arm 44 link 46 is pivoted in substantially the center line thereof, as indicated at 47, while the other end of said link 46 is pivoted to an offset bracket 48 so disposed that when the members are folded in the zigzag manner stated the two hinged arms 44 and 45 will lie snugly side by side one in front of the other in substantially parallel position, the bracket arm 48 overlying the arm 44 near its pivot, and the link overlying arm 45. The arms 44 and 45 and the link 46 are designed to sustain curtains 49 which depend therefrom when the arms are extended and completely enclose a compartment over the platform 17. Curtain sections 50, as shown in Figure 7, are provided for the purpose of filling the lateral spaces between the awning frame 33 and said folding arms in inclement weather. Said curtain sections may be fastened by ordinary carriage curtain fasteners. In the rear of the body there are provided suitable folding shelves, drawers, lockers, and equipment for cooking, while at the left side in the rear as shown in Figure 5 are faucets for dispensing hot or cold water from suitable containers carried on the vehicle. A fore and aft passageway through the body is provided so that passage may be had from the seat in the front to the rear, and to bathing apparatus, wardrobes and the like, disposed within the body.

In order to supply hot and cold water two water tanks are carried upon opposite sides of the vehicle, one being shown at 51. Pressure may be applied to these tanks by a hand air pump or otherwise. The water in the tank designed for hot water is intended to be heated by means of the exhaust of the engine, a branch from the exhaust conduit (not shown) having been provided so that the exhaust may be diverted through the hot water tank at will.

Figures 8, 9:
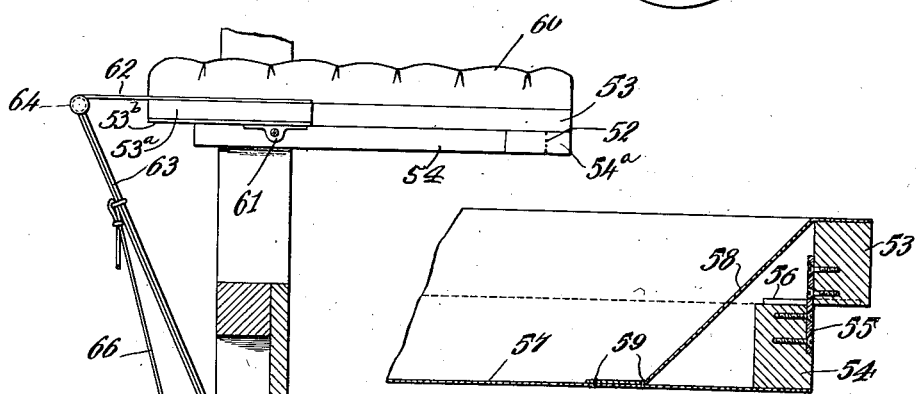
Figure 8 is a detail of a folding berth in position to be occupied.
Figure 9 is a section through a portion of one of the berths.

On each side of the body is a folding berth, said berths when closed or out of use constituting with the awnings or roof flaps thereof, panels in the sides of the body. Each berth 52 consists of a frame preferably composed of two members or bows made of bent wood, as shown in Figures 8 and 9, the inner face of the inner or upper bow 53 being substantially flush with the outer face of the lower or outer bow 54, said two bows being thus superimposed and offset with respect to each other as shown. Metallic plates 55 set into the outer surface of the frame bow 54 and engaging the inner surface of the frame bow 53, and other metallic plates 56 secured to the under face of said bow 53 and the upper face of bow 54 at right angles to the former plates, hold them rigidly in fixed relative positions. Canvas 57 or the like is tightly stretched across the frame member 54 and secured to its lower face, and webbing 58, stitched to the stretched canvas at 59, extends to the upper face of the bow 53 to which it is tacked or otherwise secured, as indicated in Figure 9. This makes a particularly strong structure adapted to receive upholstery 60 to form a berth. The canvas may be applied during the process of manufacture while the bent wood frame is held in clamps, the release of the clamps permitting the wood to spring and tighten the canvas. At each inner or lower corner a block 53$^a$, having a rectangular outer corner, is bolted to bow 53 in order to form a suitable support for a hinge, and to fill in the opening of the side of the vehicle. This block 53$^a$ may be overlaid by a metal plate 53$^b$ for strengthening purposes. A corresponding block 54$^a$ is secured to the outer or upper corners of bow 54 in order to square these corners. By the construction described a rabbet is formed by the bows 53 and 54 around the outer lower edge of the berth, into which the awning bow, (to be later described) fits when the berth is folded flush with the side wall of the vehicle body.

Each of the berths is hinged in the side frames of the body by a hinge 61 located at a distance from the inner or lower edge of the berth but between said edge and the longitudinal center. Projecting inward from the upper or inner frame bow 53 of each berth are metal extensions 62, one end of a flexible limiting link such as a cable or strap 63 being secured to the end of said extensions at 64, and the other end fastened to some portion of the body frame as at 65. Connected also either to this limiting cable 63 or directly to the metal extension by a flexible connection 66 is a spring brake or snubbing device 67 of any suitable known construction. When the berth is unfolded into the position illustrated in Figure 8 the brake device prevents it from jarring or coming too suddenly to a stop. The position of the hinge 61 well under the berth enables it to hold great weight without strain.

Figure 19:
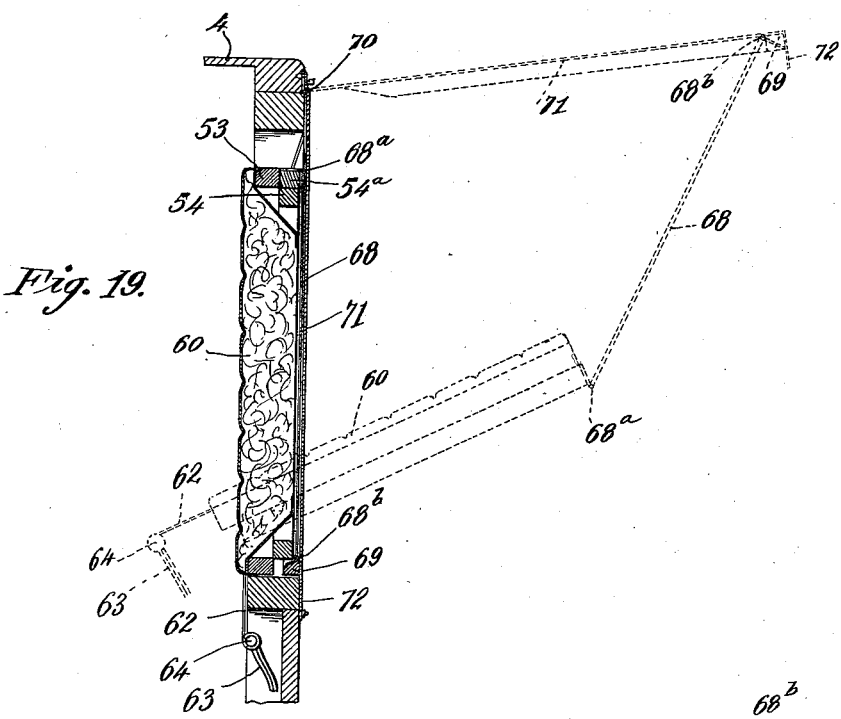
Figure 19 is a detail section showing, in full lines, a folded berth and awning, and in dotted lines one position assumed in unfolding.
Figure 20:
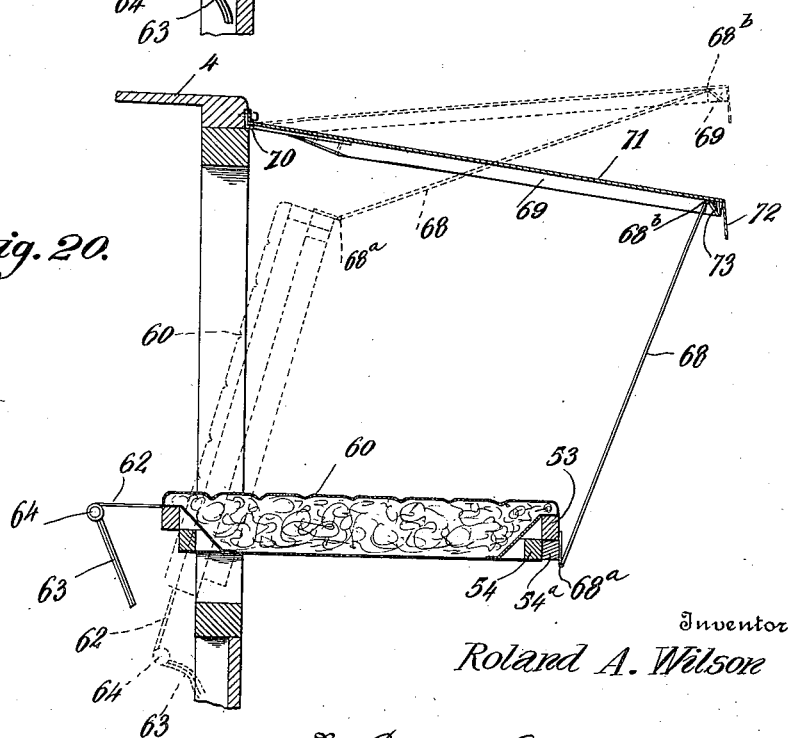
Figure 20 is a detail section showing in full lines a berth opened for occupancy and in dotted lines one position assumed in folding.

Pivoted to the free edge of each berth near each end at 68$^a$ is one end of a stiff link 68 the other end of which is hinged at 68$^b$ at or near the free edge of an awning frame 69 pivoted at 70 to a longitudinal edge of the roof section 4. This awning frame 69 is covered with suitable waterproof fabric 71, such as vehicle tops are ordinarily covered with, and has marginal flaps 72 extending beyond the ends and longitudinal edge of the frame, said flaps being provided with eyelets whereby they may be properly secured to fastening devices on the awning frame 33 and along the body. The length of the pivoted links 68 referred to, one end of each of which is pivoted to the outer longitudinal edge of a berth and the other end to the inner upper edge of the longitudinal outer member of the awning frame, is such that as the berth is raised the awning is first raised slightly and as the berth continues to fold inward the lower end of the link goes with it and finally the said berth and awning fold in zigzag fashion, the awning coming down over the outside or under side of the berth closing the opening and covering the berth, the frame 63 fitting in the said rabbet as indicated in Figure 19. The margins of the fabric are then secured by usual carriage curtain fasteners to the side of the body and over the rear corner to the frame 33; a fabric flap 72$^a$ secured to the body in front of the berth opening is then secured over the joint, the whole forming a water tight closure. The berths may be unfolded when the adjustable roof section 4 is down, as shown in Figure 4; when the adjustable section 4 is raised the awnings over the berths assume a steeper incline as illustrated in Figure 5. The links 68 are hinged, as stated, inside of the outer longitudinal member of the awning frame 69; and in order to allow said links to take the position shown in Figure 5, the said bows have been notched beneath the hinges of the links, as indicated at 73, Figs. 18 and 20. Extending between the said links is a screening and protecting fabric 74 which folds with the berths and their awnings. Detachable curtains (not shown) may be provided for closing the front and rear ends of the space between the berths and awnings. From the foregoing description it will be apparent that the berths may be unfolded for use instantaneously without having to disconnect or remove anything excepting the curtain fasteners. The berths are then ready for occupancy excepting for providing the bed clothing, unless it should be desired to screen either the front or the rear openings, in which event the separable curtains referred to must be attached. It will be apparent that the fabric 71 lies flat when the berth is folded, as indicated in Fig. 19.

Further sleeping accommodations may be provided by removing the back 76 of the front seat 77 and laying it crosswise on suitable supports between the front and the rear seats. The backs 78 of the rear seats are fastened in place by removably hinging each at one end, to the side of the vehicle by a rule joint (not shown). The lower edge of backs 78 have bolt like members, 79. These bolt like members 79 are also adapted to fit in suitable sockets provided at one end of each berth 52 so that each back piece may be placed in an inclined position at the end of a berth and serve as a head extension or a means for raising the pillow.

Depending from the rear portion of the under side of permanent roof section 2 is a hinged bow 80 across which curtain material may be stretched. From the edge of the bow opposite the pivoted edge 82 a pair of curtains 83 depend so as to separate that portion of the body which contains the seats from the after portion containing the various equipment referred to. The said bow may be held up adjacent the top by a suitable hook 84 or other fastening device when passengers are occupying the rear seat and the two backs 78 of said seat are in position, the curtains then depending rearward of the backs and the interior of the forward portion of the body assumes the appearance of an ordinary sedan. When the vehicle is not travelling, but has stopped for passengers to camp, the hook 84 that holds the said bow rearward may be released and the bow dropped into perpendicular position carrying the curtains forward of the position normally occupied by the backs 78. The backs 78 may be removed before or after the curtains 83 are shifted; thus additional space is provided in the rearward portion of the body.

By the means described, a comfortable, leakproof, closed vehicle of conventional appearance may be quickly transformed into temporary residential quarters. By loosening the curtain fastenings that secure the berth awnings the berth may be instantly unfolded. Similarly, by loosening the fastenings in the flaps secured over the rear corners, the awning frame 33 may be elevated part way,—sufficient to allow the hinged platform 17 to clear it; then the platform 17 may be seized and lowered, the roof section 4 then moving upward as before described with pins 43 engaging the inner ends of slots 42. Thus, descent of the platform elevates the section 4 and awning frame 33. Thereafter the awning may be pushed upward, as described, until notches 42 engage pins 43. It will be obvious that several notches 42 may be provided if it is desired to brace the awning at different inclinations. Two positions of the awning are possible with braces 40 having a single notch 42; with each additional notch an additional adjustment may be had. Should it be desired to lift the section 4 while leaving the platform 17 raised and the awning folded against the rear end of the vehicle body the top section 4 may be elevated by lowering the platform 17; pins may be inserted in the holes 31ª in supporting uprights 6 and the platform restored to its folded position; or the roof section 4 may be elevated by hand from the interior of the body and holding pins inserted in said openings 31ª.

The usual equipment of rear lights may be provided on the rear side of the platform 17 and a gasoline filling tube may extend laterally through the body as at 85.

What I claim and desire to secure by Letters Patent of the United States is as follows:

1. In mechanism of the class described, a berth comprising a frame formed of substantially rectangular inner and outer bent wood members in superposed relation, the inner surface of the inner member being substantially flush with the outer surface of the outer member, means for securing said members together, a fabric stretched across the lower face of the outer member and a webbing stitched to the fabric and secured to the upper face of the inner member.

2. In mechanism of the class described, a berth comprising a frame formed of substantially rectangular inner and outer members in superposed relation, the inner surface of the inner member being substantially flush with the outer surface of the outer member, means for securing said members together comprising plates secured to the outer surface of the outer member and the inner surface of the inner member.

3. In mechanism of the class described, a berth comprising a frame formed of substantially rectangular inner and outer members in superposed relation, the inner surface of the inner member being substantially flush with the outer surface of the outer member, means for securing said members together comprising plates secured to the outer surface of the outer member and the inner surface of the inner member and other plates secured to the upper surface of the outer member and the under surface of the inner member.

4. In mechanism of the class described, a body frame, a berth hinged thereto, an awning hinged to said frame above said berth, a link pivoted to the berth and awning adjacent the free edges thereof, said link being so proportioned and disposed with respect to the pivotal axis of said berth and awning that said berth, awning and link may fold in zigzag manner into parallel relation.

5. In mechanism of the class described, a vehicle body having an opening in its side, a berth adapted to fold into said opening, when closed and to extend partly within and partly without the vehicle when opened, and awning hinged above said opening, said awning having a fabric cover and a fabric flap on said body adapted to cover the joint between the forward edge of said awning and the body when the berth and awning are folded.

6. In mechanism of the class described, a vehicle body having a vertically adjustable roof section and an opening in the side of said body, a berth adapted to fold into said opening, an awning hinged to said adjustable roof section, and a link pivoted to the free edges of the berth and awning.

7. In mechanism of the class described, a vehicle body having a vertically adjustable roof section and an opening in the side of the body, a berth adapted to fold into said opening, an awning having a bow-frame hinged to said adjustable roof section, a link pivoted to the free edge of said berth and to the inner upper side of said bow-frame, said bow-frame having an inclined notch therein for the reception of the link when the roof is in elevated position.

8. In mechanism of the class described, a vehicle body having a permanent roof section and a vertically adjustable roof section, a transverse trough at the rear edge of the permanent roof section and an angle strip secured transversely to the front of the adjustable section, said angle strip having a depending lip adapted to enter said trough when the adjustable section is lowered flush with the fixed section.

9. In mechanism of the class described, a vehicle body having a permanent roof section and a vertically adjustable roof section, a transverse trough at the rear edge of the permanent roof section, said transverse trough having closed ends, an angle strip securing transversely to the front of the adjustable section, said angle strip having a depending lip adapted to enter said trough when the adjustable section is lowered flush with the fixed section, and a drain pipe leading from one end of said trough downward within the side wall of the vehicle body.

10. In mechanism of the class described, a vehicle body, a platform hinged to the rear thereof, a vertically movable roof section, a rigid awning hinged to the rear of the roof section, brace arms pivoted to a fixed part of the body and having a lost motion connection with the awning, means on the brace arms for making a fixed pivotal connection with the awning, and connections between the platform and the roof section whereby the descent of the platform elevates the roof section.

11. In mechanism of the class described, a vehicle body, having a vertically adjustable roof section, a rigid awning hinged to the rear edge of the adjustable roof section, brace arms pivoted to a fixed part of the body, each brace arm having a slot provided with an offset notch in its outer end, and pins on the awning engaging in said slots.

12. In mechanism of the class described, a body, spaced arms freely pivoted on said body so as to swing horizontally, a laterally offset bracket on the end of one arm, a link having one end pivoted on said offset bracket, and its other end pivoted centrally to the end of the other arm, said arms and link constituting a folding curtain support.

In testimony whereof I affix my signature.

ROLAND A. WILSON.